W. C. YATES & W. O. LUM.
AUTOMATIC CIRCUIT CONTROLLING DEVICE.
APPLICATION FILED SEPT. 22, 1906.
957,452.
Patented May 10, 1910.
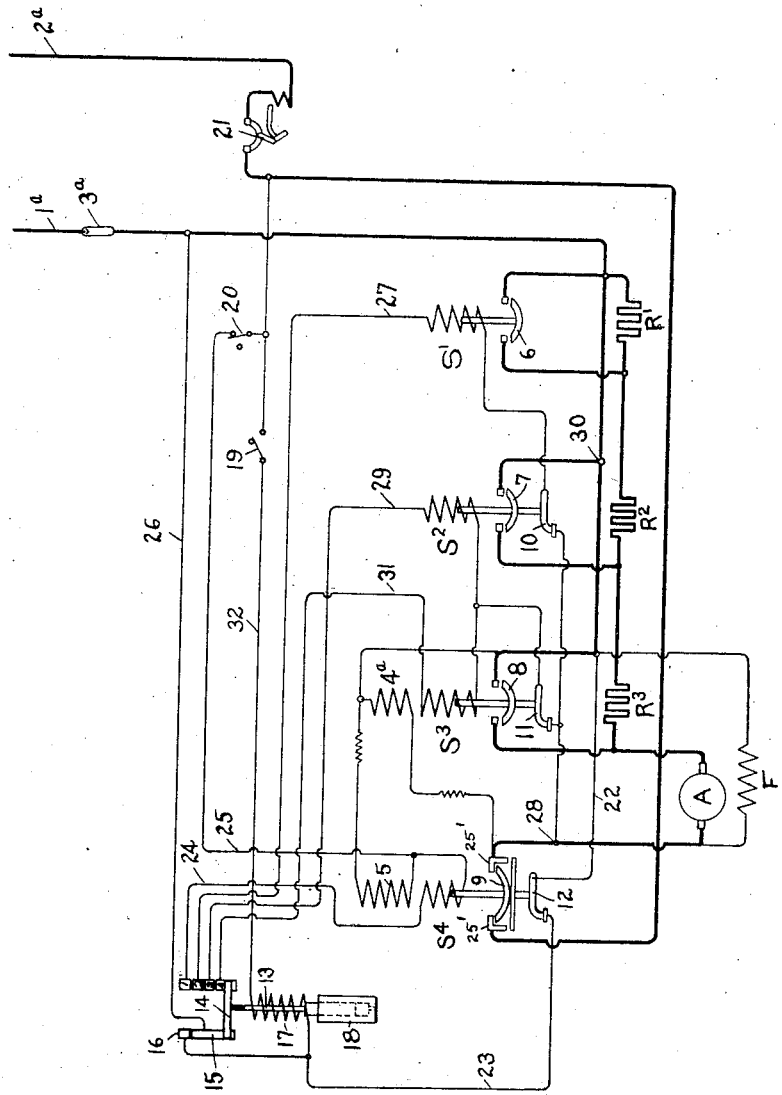
WITNESSES
INVENTORS,
WILLIAM C. YATES,
WALTER O. LUM.
by
Atty.

UNITED STATES PATENT OFFICE.

WILLIAM C. YATES AND WALTER O. LUM, OF SCHENECTADY, NEW YORK, ASSIGNORS TO GENERAL ELECTRIC COMPANY, A CORPORATION OF NEW YORK.

AUTOMATIC CIRCUIT-CONTROLLING DEVICE.

957,452.  Specification of Letters Patent. Patented May 10, 1910.

Application filed September 22, 1906. Serial No. 335,693.

*To all whom it may concern:*

Be it known that we, WILLIAM C. YATES and WALTER O. LUM, citizens of the United States, residing at Schenectady, county of Schenectady, State of New York, have invented certain new and useful Improvements in Automatic Circuit-Controlling Devices, of which the following is a specification.

This invention relates to devices for controlling electric motor circuits, and has for its object the provision of means whereby electric circuits may be automatically controlled in a reliable, safe and efficient manner.

Our invention relates more specifically to that type of motor control in which a plurality of separately actuated electromagnet switches operate to successively cut sections of resistance out of circuit, the switches being controlled by a master controller.

In carrying out our invention, we provide, in connection with electromagnet switches, a master controller which operates automatically to control the circuits of the switches. The arrangement is such that when a switch is closed in the control circuit, the master controller, which normally is biased to running position, is moved to starting position in opposition to a bias, which may be either gravity or a spring. When the controller reaches starting position, the motor circuit is closed and at the same time the energizing circuit of the master controller is opened. The controller therefore returns in response to its bias to running position, and as it does so, energizes the successive switches to affect the motor circuit, as for instance, by cutting out starting resistance. The deënergizing of the master controller is accomplished by one of the electromagnetic switches which opens the energizing circuit of the controller simultaneously with the closing of the motor circuit. We also provide means whereby each magnetic switch as it closes, opens the circuit of the preceding switch, thereby making a more durable and reliable device and at the same time simplifying the construction.

In the accompanying drawing, in which for purposes of illustration we have shown our invention embodied in a certain specific structure, $1^a$ and $2^a$ represent the mains supplying current to a motor armature A having a field F. A series of resistances $R^1$, $R^2$ and $R^3$ are provided for starting the motor, the arrangement being such that when the switch $3^a$ is closed, these resistances are in series with the motor armature. These resistances are provided with electromagnetic switches $S^1$, $S^2$ and $S^3$ adapted to successively cut these resistances out of circuit. Switches $S^1$ and $S^2$ each have an actuating coil, while switch $S^3$ has in addition to the actuating coil a holding coil $4^a$, for purposes hereinafter described. A switch $S^4$ is likewise provided for closing the motor armature circuit, which switch is also provided with a holding coil 5. Each of these switches is provided with a bridging contactor, respectively, 6, 7, 8 and 9 adapted to bridge corresponding contacts. Switches $S^2$, $S^3$ and $S^4$ each have an additional contactor 10, 11 and 12, respectively, arranged to control the circuits of the magnet coils.

The master controller whereby the various switches are controlled, comprises a movable element 13 having a contactor or controlling element 14 moving over the contacts 1, 2, 3 and 4 on one side and contacts 15 and 16 opposite thereto. The movable element 13 forms a core for the energizing coil 17 for moving the element 14 upward, and a dash-pot 18 is provided for retarding the element as it falls. The contacts 1, 2, 3 and 4 connect with the switches $S^4$, $S^1$, $S^2$ and $S^3$, respectively, so that they are energized in this order as the contactor moves downward. The contact strip 15 is connected with one side of the line while the contact 16 is connected with the same side of the line through contactor 12. A normally open switch 19 is provided in the controller circuit for starting the motor, and a normally closed switch 20 also in the controller circuit is provided for stopping the motor. A circuit breaker 21 is likewise provided to protect the circuit in the usual way.

The arrangement of the circuits and the mode of operation is as follows: The main switch $3^a$ being closed and it being desired to start the motor, the switch 19, which may be a push button or any similar switch, is closed. This causes the coil 17 of the master controller to be energized from the positive side of the line $1^a$, through conductor 22, contactor 12 and conductor 23 to the coil and back through conductor 32 and switch 19 to the other side of the line at $2^a$. Coil 17 being energized, the contactor 14 is moved upward, the dash-pot 18 being so arranged that the rod 17 will move freely in its upward movement. When the contactor 14 reaches its upper position, it bridges contacts 1 and 16. This causes the lower or operating coil of the switch S⁴ to be energized, the current passing from the positive main through contactor 9, conductor 23, to contacts 16 and 1, thence by conductor 24 to the coil, thence by conductor 25, through switch 20, back to the negative main at 2ª. The energizing of the switch S⁴ causes it to raise its core, thereby bridging the contacts 25′ and closing the motor circuit, and at the same time opening contactor 12. The opening of this contactor, it will be seen, deenergizes coil 17, and the contactor 14 thereupon begins to fall by gravity, being retarded by the dash-pot 18. At the same time that the coil 17 is deënergized by the opening of the contactor 12, the circuit of the actuating coil of switch S⁴ will also be opened since the circuit of both coils passes through the contactor 12. The core, however, will not drop since it is held up by the holding coil 5, which, while it is insufficient to raise the core, is sufficient to hold it. This coil is connected permanently in circuit across the line through the switch 20. The contactor 14 as it drops will next bridge contact 2 and contact strip 15. This will cause the energizing of the switch S¹ through conductor 26, contact 15 and 2 and conductor 27, returning to the opposite side of the line at 28 through contactor 10. The switch S¹ being energized, the section of resistance R¹ will be short-circuited by the bridging contact 6 so that the current of the motor will pass from main 1ª, across bridging contact 6, through resistances R² and R³, through the armature A, across contacts 25′, and back to the main line at 2ª. The contactor 14 continuing to drop bridges the contacts 15 and 3 whereupon the coil of switch S² will be energized from contact 3, through conductor 29, thence through contactor 11, to the main line at 28. This will cut out the section of resistance R² so that the current will pass from main 1ª directly to junction 30 and thence through the bridging contact 7 to resistance R³ as before. It will be seen now that the current does not pass through the contact 6, and the circuit of switch S¹ is therefore opened at contactor 10 as switch S² operates. When the contactor 14 reaches the lower contact 4, the lower coil of switch S³ will be energized through conductor 31, the energizing current passing back to the other side of the line through contactor 11. The lower coil of switch S³ being energized, the section of resistance R³ will be cut out, and at the same time by the opening of contactor 11, the operating coil of this switch will be deënergized. The switch, however, will be maintained closed by holding coil 4ª connected in series with contactor 9 and the switch 20 and in parallel with coil 5. The last section of resistance R³ being cut out, the current of the motor will pass from main 1ª, across the bridging contact 8, through the motor armature A, across the contacts 25′, thence back to the line at main 2ª. It will be seen that the motor circuit is maintained closed by the holding coils 4ª and 5 so that as soon as coil 5 is deënergized by the opening of switch 20, the motor circuit will be opened. Moreover the coils 4ª and 5 which are in parallel will open the main circuit by the failure of voltage due to any other cause, as for instance, by the opening of the circuit breaker 21.

From the above it will be seen that the motor circuit is automatically controlled by the simple operation of a push button switch in a control circuit. The switches are each deënergized by the operation of the next successive switch, with the exception of the two switches which are maintained in circuit by the holding coils, and which may be deënergized by the normally closed switch 20. The arrangement is an extremely simple and convenient one, and adapts itself equally well for the control of either large or small motors.

It will be understood of course that many modifications of the above described arrangement will suggest themselves to those skilled in the art, and we therefore do not confine our invention to what we have shown and described except in so far as our invention is limited to the scope of the claims annexed hereto.

What we claim as new and desire to secure by Letters Patent of the United States, is,—

1. The combination with an electric motor circuit, of means for controlling the same comprising separately actuated electromagnetic switches in said circuit, a controlling element normally biased to running position, an electromagnetic device controlled by one of said switches for moving said element to starting position, and connections whereby said switches are successively operated by said element as it returns to running position.

2. The combination with an electric motor circuit, of means for controlling the same comprising separately actuated electromagnetic switches in said circuit, a controlling element normally biased to running position, an electromagnetic device controlled by one of said switches for moving said element to starting position, means whereby said element automatically moves to running position, and connections whereby said switches are successively operated by said element as it returns to said position.

3. The combination with an electric motor circuit, of means for controlling the same comprising separately actuated electromagnetic switches in said circuit, a controlling element biased to running position, an electrically controlled device for moving said element to starting position, and connections whereby said device is deënergized and one of said switches simultaneously operated to affect the circuit when said element reaches starting position.

4. The combination with an electric motor circuit, of means for controlling the same comprising a plurality of electromagnetic switches in the motor circuit, an automatically operated electrically controlled device for successively energizing said switches to affect the motor circuit, and connections whereby certain of said switches are each deënergized by the actuation of the next succeeding switch.

5. The combination with an electric motor circuit, of means for controlling the same comprising a plurality of electromagnetic switches in the motor circuit, an electrically controlled device for successively energizing said switches to affect the motor circuit, and connections whereby certain of said switches are each deënergized by the actuation of the next succeeding switch.

6. The combination with an electric motor circuit, of means for controlling the same comprising separately actuated electromagnetic switches in said circuit, a controlling element biased to running position, an electrically controlled device for moving said element to starting position, means whereby said device is deënergized by the actuation of one of said switches, and connections whereby the remaining switches are successively operated by said element as it returns to running position.

7. The combination with an electric motor circuit, of means for controlling the same comprising separately actuated electromagnetic switches in said circuit, a controlling element biased to running position, an electrically controlled device for moving said element to starting position, means whereby said element automatically moves to running position, means for successively energizing said switches as the element returns to said position, and connections whereby certain of said switches are each deënergized by the actuation of the next succeeding switch.

8. An automatic starter for electric motors comprising a master controller having a bias to running position, electrically controlled means for moving said controller to starting position, electromagnetic switches actuated as the controller moves to running position, and connections whereby the actuation of one of said switches causes the movement of the controller to running position.

9. An automatic starter for electric motors comprising a master controller having a bias to running position, electrically controlled means for moving said controller to starting position, electromagnetic switches actuated by the movement of the controller to running position, connections whereby the actuation of one of said switches causes the movement of the controller to running position, and means whereby certain of said switches are each deënergized by the actuation of the next succeeding switch.

In witness whereof, we have hereunto set our hands this 21st day of September, 1906.

WILLIAM C. YATES.
WALTER O. LUM.

Witnesses:
BENJAMIN B. HULL,
HELEN ORFORD.